(12) United States Patent
Wing et al.

(10) Patent No.: US 7,738,383 B2
(45) Date of Patent: Jun. 15, 2010

(54) TRACEROUTE USING ADDRESS REQUEST MESSAGES

(75) Inventors: Daniel G. Wing, San Jose, CA (US); Flemming Stig Andreasen, Marlboro, NJ (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 368 days.

(21) Appl. No.: 11/614,843

(22) Filed: Dec. 21, 2006

(65) Prior Publication Data

US 2008/0151764 A1    Jun. 26, 2008

(51) Int. Cl.
*H04J 3/14* (2006.01)
*H04L 1/00* (2006.01)
*H04L 12/26* (2006.01)

(52) U.S. Cl. .................. 370/236; 370/242; 370/252; 370/389; 370/465; 709/224

(58) Field of Classification Search .................. 370/248
See application file for complete search history.

(56) References Cited

U.S. PATENT DOCUMENTS

| | | |
|---|---|---|
| 4,006,320 A | 2/1977 | Markl |
| 4,486,877 A | 12/1984 | Turner |
| 4,569,042 A | 2/1986 | Larson |
| 4,630,268 A | 12/1986 | Rodenbaugh |
| 4,907,277 A | 3/1990 | Callens et al. |
| 5,010,544 A | 4/1991 | Chang et al. |
| 5,014,265 A | 5/1991 | Hahne et al. |
| 5,121,382 A | 6/1992 | Yang et al. |
| 5,159,592 A | 10/1992 | Perkins |
| 5,243,342 A | 9/1993 | Kattemalalavadi et al. |
| 5,274,643 A | 12/1993 | Fisk |
| 5,343,461 A | 8/1994 | Barton et al. |
| 5,353,283 A | 10/1994 | Tsuchiya |
| 5,371,852 A | 12/1994 | Attanasio et al. |
| 5,394,402 A | 2/1995 | Ross |
| 5,416,842 A | 5/1995 | Aziz |
| 5,422,876 A | 6/1995 | Turudic |
| 5,426,637 A | 6/1995 | Derby et al. |
| 5,430,715 A | 7/1995 | Corbalis et al. |
| 5,450,449 A | 9/1995 | Kroon |
| 5,452,294 A | 9/1995 | Natarajan |
| 5,473,599 A | 12/1995 | Li et al. |
| 5,491,692 A | 2/1996 | Gunner et al. |

(Continued)

OTHER PUBLICATIONS

S. Niccolini, et al., draft-niccolini-ippm-storetraceroutes-02.txe, Oct. 24, 2005.*

(Continued)

*Primary Examiner*—Seema S Rao
*Assistant Examiner*—Jianye Wu
(74) *Attorney, Agent, or Firm*—Stolowitz Ford Cowger LLP

(57) ABSTRACT

In one embodiment, an endpoint sends messages containing Simple Traversal of User Datagram Protocol (UDP) Through Network Address Translators (NATs) (STUN) requests to traceroute a path to the remote endpoint. The traceroute may be completed through security devices such as NATs and firewalls. Receipt of a STUN response from the remote endpoint signals that one of the traceroute packets reached the remote endpoint whereas the other traceroute packets have elicited error responses from intermediary, on-path routers, allowing these routers to be identified.

18 Claims, 4 Drawing Sheets

U.S. PATENT DOCUMENTS

| | | | |
|---|---|---|---|
| 5,500,851 | A | 3/1996 | Kozaki et al. |
| 5,500,860 | A | 3/1996 | Perlman et al. |
| 5,519,704 | A | 5/1996 | Farinacci et al. |
| 5,555,256 | A | 9/1996 | Calamvokis |
| 5,561,669 | A | 10/1996 | Lenny et al. |
| 5,563,875 | A | 10/1996 | Hefel et al. |
| 5,594,732 | A | 1/1997 | Bell et al. |
| 5,602,918 | A | 2/1997 | Chen et al. |
| 5,604,803 | A | 2/1997 | Aziz |
| 5,617,417 | A | 4/1997 | Sathe et al. |
| 5,617,421 | A | 4/1997 | Chin et al. |
| 5,621,721 | A | 4/1997 | Vatuone |
| 5,623,492 | A | 4/1997 | Teraslinna |
| 5,623,605 | A | 4/1997 | Keshav et al. |
| 5,642,515 | A | 6/1997 | Jones et al. |
| 5,650,993 | A | 7/1997 | Lakshman et al. |
| 5,651,002 | A | 7/1997 | Van Seters et al. |
| 5,659,542 | A | 8/1997 | Bell et al. |
| 5,673,265 | A | 9/1997 | Gupta et al. |
| 5,675,741 | A | 10/1997 | Aggarwal et al. |
| 5,689,566 | A | 11/1997 | Nguyen |
| 5,699,478 | A | 12/1997 | Nahumi |
| 5,699,485 | A | 12/1997 | Shoham |
| 5,715,399 | A | 2/1998 | Bezos |
| 5,740,171 | A | 4/1998 | Mazzola et al. |
| 5,740,176 | A | 4/1998 | Gupta et al. |
| 5,742,604 | A | 4/1998 | Edsall et al. |
| 5,764,636 | A | 6/1998 | Edsall |
| 5,793,763 | A | 8/1998 | Mayes et al. |
| 5,835,494 | A | 11/1998 | Hughes et al. |
| 5,838,994 | A | 11/1998 | Valizadeh |
| 5,850,388 | A | 12/1998 | Anderson et al. |
| 5,867,666 | A | 2/1999 | Harvey |
| 5,870,397 | A | 2/1999 | Chauffour et al. |
| 5,884,010 | A | 3/1999 | Chen et al. |
| 5,918,019 | A | 6/1999 | Valencia |
| 5,931,961 | A | 8/1999 | Ranganathan et al. |
| 5,943,347 | A | 8/1999 | Shepard |
| 6,023,455 | A | 2/2000 | Takahashi |
| 6,032,194 | A | 2/2000 | Gai et al. |
| 6,061,454 | A | 5/2000 | Malik et al. |
| 6,104,695 | A | 8/2000 | Wesley et al. |
| 6,118,796 | A | 9/2000 | Best et al. |
| 6,337,861 | B1 | 1/2001 | Rosen |
| 6,192,036 | B1 | 2/2001 | Buhler et al. |
| 6,230,271 | B1 | 5/2001 | Wadlow et al. |
| 6,275,471 | B1 | 8/2001 | Bushmitch et al. |
| 6,356,545 | B1 | 3/2002 | Vargo et al. |
| 6,389,006 | B1 | 5/2002 | Bialik |
| 6,445,717 | B1 | 9/2002 | Gibson et al. |
| 6,515,967 | B1 | 2/2003 | Wei et al. |
| 6,526,044 | B1 | 2/2003 | Cookmeyer, II et al. |
| 6,584,438 | B1 | 6/2003 | Manjunath et al. |
| 6,614,781 | B1 | 9/2003 | Elliot et al. |
| 6,665,637 | B2 | 12/2003 | Bruhn |
| 6,687,225 | B1 | 2/2004 | Kawarai et al. |
| 6,687,360 | B2 | 2/2004 | Kung et al. |
| 6,700,874 | B1 | 3/2004 | Takihiro et al. |
| 6,725,191 | B2 | 4/2004 | Mecayten |
| 6,731,609 | B1 | 5/2004 | Hirni et al. |
| 6,741,600 | B1 | 5/2004 | Weiss et al. |
| 6,757,654 | B1 | 6/2004 | Westerlund et al. |
| 6,775,703 | B1 | 8/2004 | Burns et al. |
| 6,785,261 | B1 | 8/2004 | Schuster et al. |
| 6,798,739 | B1 | 9/2004 | Lee |
| 6,804,244 | B1 | 10/2004 | Anandakumar et al. |
| 6,836,804 | B1 | 12/2004 | Jagadeesan |
| 6,839,353 | B1 | 1/2005 | DeJager |
| 6,944,132 | B1 | 9/2005 | Aono et al. |
| 6,947,381 | B2 | 9/2005 | Wen et al. |
| 7,013,267 | B1 | 3/2006 | Huart et al. |
| 7,039,716 | B1 | 5/2006 | Jagadeesan |
| 7,047,190 | B1 | 5/2006 | Kapilow |
| 7,068,607 | B2 | 6/2006 | Partain et al. |
| 7,072,968 | B2 | 7/2006 | Mikami et al. |
| 7,099,820 | B1 | 8/2006 | Huart et al. |
| 7,212,517 | B2 | 5/2007 | Dzik |
| 7,286,467 | B1 | 10/2007 | Sylvain |
| 7,310,334 | B1 | 12/2007 | FitzGerald et al. |
| 7,336,620 | B2 | 2/2008 | Bennett |
| 7,352,705 | B1 * | 4/2008 | Adhikari et al. ............. 370/248 |
| 2002/0003775 | A1 * | 1/2002 | Nakano et al. ............... 370/218 |
| 2002/0067693 | A1 | 6/2002 | Kodialam et al. |
| 2002/0083186 | A1 | 6/2002 | Stringer |
| 2003/0053419 | A1 | 3/2003 | Kanazawa et al. |
| 2003/0072269 | A1 | 4/2003 | Teruhi et al. |
| 2003/0097438 | A1 | 5/2003 | Bearden et al. |
| 2003/0110276 | A1 | 6/2003 | Riddle |
| 2003/0163772 | A1 | 8/2003 | Jaworski |
| 2003/0165114 | A1 | 9/2003 | Kusama et al. |
| 2003/0208616 | A1 | 11/2003 | Laing et al. |
| 2003/0219022 | A1 | 11/2003 | Dillon et al. |
| 2003/0220971 | A1 | 11/2003 | Kressin |
| 2004/0008715 | A1 | 1/2004 | Barrack et al. |
| 2004/0052257 | A1 | 3/2004 | Abdo et al. |
| 2004/0073690 | A1 | 4/2004 | Hepworth et al. |
| 2004/0125965 | A1 | 7/2004 | Alberth et al. |
| 2004/0170163 | A1 | 9/2004 | Yik et al. |
| 2004/0193709 | A1 | 9/2004 | Selvaggi et al. |
| 2004/0218617 | A1 | 11/2004 | Sagfors |
| 2004/0223458 | A1 | 11/2004 | Gentle |
| 2004/0240431 | A1 | 12/2004 | Makowski et al. |
| 2004/0252646 | A1 | 12/2004 | Adhikari et al. |
| 2005/0036519 | A1 | 2/2005 | Balakrishnan et al. |
| 2005/0117576 | A1 | 6/2005 | McDysan et al. |
| 2005/0226172 | A1 | 10/2005 | Richardson |
| 2005/0243733 | A1 | 11/2005 | Crawford et al. |
| 2005/0246041 | A1 * | 11/2005 | Kreifeldt et al. ............... 700/94 |
| 2005/0283639 | A1 | 12/2005 | Le Pennec et al. |
| 2006/0041431 | A1 | 2/2006 | Maes |
| 2006/0098586 | A1 | 5/2006 | Farrell et al. |
| 2006/0112400 | A1 | 5/2006 | Zhang et al. |
| 2006/0122835 | A1 | 6/2006 | Huart et al. |
| 2006/0215684 | A1 | 9/2006 | Capone |
| 2006/0268742 | A1 | 11/2006 | Chu et al. |
| 2006/0274760 | A1 * | 12/2006 | Loher .................... 370/395.52 |
| 2007/0064616 | A1 | 3/2007 | Miranda et al. |
| 2007/0107034 | A1 * | 5/2007 | Gotwals .................... 725/129 |
| 2007/0153774 | A1 | 7/2007 | Shay et al. |
| 2007/0171835 | A1 | 7/2007 | Gobara et al. |
| 2007/0212065 | A1 | 9/2007 | Shin et al. |
| 2007/0286165 | A1 | 12/2007 | Chu et al. |

OTHER PUBLICATIONS

C. Jennings, draft-jennings-behave-test-results-02.txt, Jun. 25, 2006.*

Andreasen, et al., RTP No-Op Payload Format, Internet-Draft, Feb. 2004, pp. 1-8, Internet Engineering Task Force.

Rosenberg, et al., STUN—Simple Traversal of User Datagram Protocol (UDP) Through Network Address Translators (NATs), RFC 3489, Mar. 2003, pp. 1-44, Network Working Group.

International Preliminary Report on Patentability and Written Opinion of ISA for PCT/US2004/039431; mailed Jun. 14, 2009; ISA/US.

International Search Report for PCT/US2004/039431; mailed Jun. 14, 2009; ISA/US.

International Preliminary Report on Patentability and Written Opinion of ISA for PCT/US2007/069567; mailed Aug. 12, 2008.

International Search Report for PCT/US2007/69567; mailed Aug. 12, 2008; ISA/US.

D. Mathieson, C. Kalbfleisch, S. Hunt and K. Low, "High Speed Serial Communications for Control Systems," IEEE, pp. 1826-1828.

R. Ullmann, "Rap: Internet Route Access Protocol," Internet Community's Request for Comments No. 1476, (Jun. 1993).

P. Newman et al., "Ipsilon Flow Management Protocol Specification for Ipv4 Version 1.0," Internet Community's Request for Comments No. 1953, (May 1996).

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments No. 1577, (Jan. 1994).

M. McGovern, et al., "CATNIP: Common Architecture For The Internet," Internet community's Request for Comments No. 1707, (Oct. 1994).

S. Deering, et al., "Internet Protocol, Version 6," Internet Community's Request for Comments No. 1883, (Dec. 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route-Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

G. P. Chandranmenon and G. Varghese, "Trading Packet Headers for packet Processing," Proc. ACM Sigcomm '95, Boston, MA, Sep. 1995, pp. 162-173.

Callon et al., "A Framework for Multiprotocol Label Switching," IETF Network Working Group Internet Draft draft-ietf-mpls-framework-02.txt, Nov. 21, 1997.

Rosen et al., "A proposed Architecture for MPLS," IETF Network Working Group Internet Draft draft-ietf-mpls-arch-00.txt, Aug. 1997.

Woundy et al., "ARIS: Aggregate Route-Based IP Switching," Internet Draft draft-woundy-aris-ipswitching-00.txt, Nov. 1996.

Kalyaranaman et al., "Performance and Buffering Requirements of Internet Protocols over ATM ABR and UBR Services," IEEE Communications magazine, vol. 36, No. 6, Jun. 1998.

Liao et al., "Adaptive recovery techniques for real-time audio streams," IEEE Infocom 2001, Twentieth Annual Joint Conference of the IEE Computer and Communications Societies Proceedings Apr. 22-26, 2001, vol. 2, pp. 815-823.

SFC Listing of Related Cases for 2705-0598, Oct. 26, 2009.

Rosen et al., "MPLS Label Stock Encoding", RFC 3032, Jan. 2001.

Information Sciences Institute, University of Southern California, "Internet Protocal Darpa Internet Program Protocol Specification", Sep. 1981, pp. 1-49.

Information Sciences Institute, University of Southern California, "Internet Protocal Darpa Internet Program Protocol Specification", Sep. 1981, pp. 1-88.

Information Sciences Institute, University of Southern California, R. Braden, Internet Engineering Task Force, "Requirements for Internet Hosts—Communication Layers", Oct. 1989, pp. 1-115.

H. Schulzrinne, et al., RTP: A Transport Protocol for Real-Time Applications, RFC3550, Network Working Group, Jul. 2003, 98 pages.

H. Schulzrinne and GMD Fokus, "RTP Profile for Audio and Video Conferences with Minimal Control", Jan. 1996, pp. 1-17.

M. Handley and V. Jacobson, "SDP: Session Description Protocol", Apr. 1998, pp. 1-40.

H. Schulzrinne, GMD Fokus, S. Casner, R. Frederick, and V. Jacobson, "RTP: A Transport Protocol for Real-Time Applications", Jan. 1996, pp. 1-71.

Webpage http://www.cis.ohio-state.edu/~cliu/ipmultimedia/ entitled "Multimedia Over IP: RSVP, RTP, RTCP, RTSP", Jan. 8, 2002, pp. 1-27.

Townsley, et al.Layer Two Tunneling Protocol "L2TP", RFC 2661, Network Working Group, Aug. 1999, 75 pages.

Prosecution History for U.S. Appl. No. 10/723,118, filed Nov. 26, 2003.

Prosecution History for U.S. Appl. No. 11/626,819, filed Jan. 24, 2007.

* cited by examiner

TRACEROUTE USING ADDRESS REQUEST MESSAGES

TECHNICAL FIELD

The present disclosure relates generally to the field of networking.

BACKGROUND

A traceroute is a technique for determining a path used by packets traveling through the network from one endpoint to a remote endpoint. Determination of this path is useful when diagnosing connectivity issues between the two endpoints.

Traceroute involves first sending an Internet Protocol (IP) packet with a Time-To-Live (TTL) value equal to one to a remote host on an unused UDP port. When a first on-path router receives the IP packet and decrements the TTL value to zero, the first on-path router drops the entire message and sends back an Internet Control Message Protocol (ICMP) packet indicating that the IP packet's lifetime has been exceeded. This ICMP error packet contains the IP header and first eight bytes of the payload from the IP packet that exceeded it's lifetime. When the payload is UDP, this information will include the packets source IP-address and port as well as its length. Next, the endpoint sends another IP packet with a TTL value equal to two, which reaches a second on-path router before eliciting the ICMP communication. This process continues until an IP packet has a sufficient TTL value to reach the remote endpoint. When an IP packet reaches the remote endpoint, the receipt of a UDP packet on an unused UDP port elicits an invalid port ICMP error signaling packet from the remote endpoint, which indicates completion of the traceroute.

On-path security devices can interfere with traceroutes by observing the addressing of the packets to the unused UDP port, and blocking those packets from reaching the remote endpoint. When the packets are blocked, the invalid port ICMP error is not elicited and the traceroute does not complete. The disclosure that follows solves these and other problems.

DESCRIPTION OF EXAMPLE EMBODIMENTS

Overview

Figure 1:
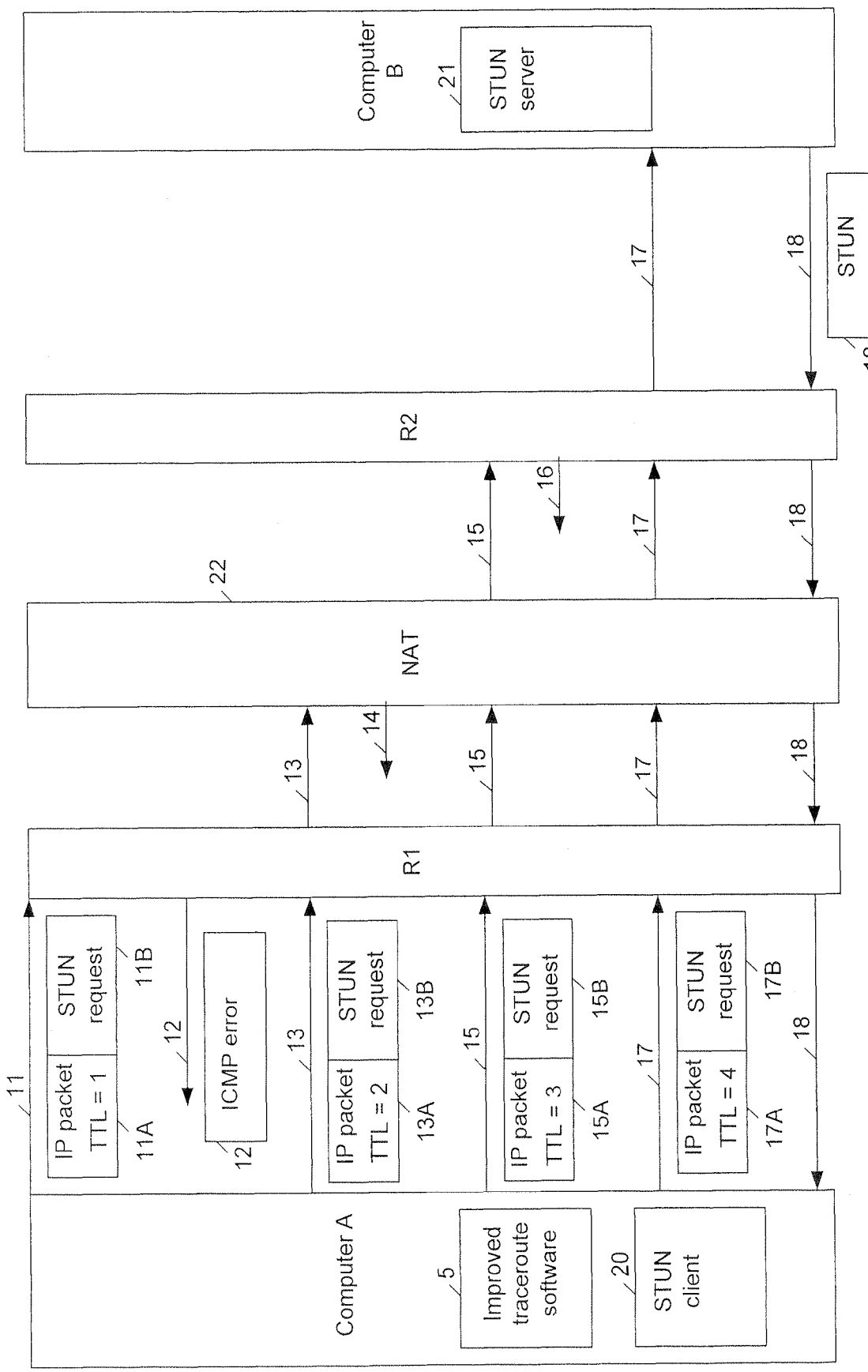
FIG. 1 illustrates an example computer for sending Simple Traversal of User Datagram Protocol (UDP) Through Network Address Translators (NATs) (STUN) requests to traceroute a path to a remote endpoint.

In one embodiment, an endpoint sends messages containing Simple Traversal of User Datagram Protocol (UDP) Through Network Address Translators (NATs) (STUN) requests to traceroute a path to the remote endpoint. The traceroute may be completed through security devices such as NATs and firewalls. Receipt of a STUN response from the remote endpoint signals that one of the traceroute packets reached the remote endpoint whereas the other traceroute packets have elicited error responses from intermediary, on-path routers, allowing these routers to be identified.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example computer for sending STUN requests to traceroute a path to a remote endpoint.

Referring to FIG. 1, a call for media exchange between computers A and B is established using Session Initiation Protocol (SIP) or a similar protocol. The SIP signaling message includes a Session Description Protocol (SDP) attachment describing the media streams to be established and for each media stream, it includes instructions to use Interactive Connectivity Establishment (ICE) to establish connectivity.

The computers A and B are generally unaware of the path that the call and its associated media take through the network. In this example, the media path extends through the router R1, through a NAT 22 providing address translation for computer B, and through router R2. To identify the path that the media takes through the network, as well as for diagnostic reasons, computer A traceroutes the media path. The following traceroute process may occur after ICE, or during ICE by leveraging one of the STUN messages sent during ICE.

The improved traceroute software 5 generates a traceroute communication 11 including IP packet 11A containing a STUN request 11B generated by a local STUN client 20. The TTL field in the IP packet 11A is set to one to elicit an ICMP error message 12 from a first on-path router.

The communication 11 is addressed to the same IP address and port number used for sending media to computer B. This is in contrast to other traceroutes that are addressed to an invalid port on a remote endpoint. Addressing the traceroute messages with the port used for the media path (instead of a different, invalid port) advantageously can prevent on-path routers from processing the traceroute messages with a different priority or forwarding them along a different path than the media packets themselves, and also prevent interference from firewalls and NATs. When the traceroute messages are processed using the same priority and destination address as the media flow, the traceroute messages and the media flow packets are given the same treatment by the network. As a result, the traceroute messages will flow on the same path as the media flow, experience the same delays, etc., which produces more accurate diagnostic information.

Router R1 receives the communication 11 and decrements the TTL value by one. Upon observing a TTL equal to zero, router R1 drops the communication 11 and generates an ICMP error 12.

Next, or in parallel with sending communication 11, computer A sends communication 13 including IP packet 13A with TTL equal to two and containing STUN request 13B. This communication 13 is forwarded by router R1 because the TTL value is not decremented to zero. The communication 13 is received by the NAT 13, which decrements the TTL value to zero and sends an ICMP error 14.

Next, or in parallel with sending communications 11 and 13, computer A sends communication 15 including IP packet 15A with TTL equal to three and STUN request 15B. This communication 15 is forwarded by router R1 because the TTL value is not decremented to zero.

Next, the NAT 22 receives the forwarded communication 15. Since the communication 15 is addressed to the same port number as the established media flow, and has a TTL value greater than zero, the NAT forwards the communication 15. This is in contrast to other traceroute techniques that require addressing using an invalid port to elicit an error response from the remote endpoint. Such undeliverable messages are dropped by intermediary NATs when address translation identifies an invalid port. Although there are no intermediary firewalls in this example, the communication 15 is able to pass through a firewall or other security device for similar reasons that the communication 15 is forwarded by NAT 22. Router R2 receives the communication 15, decrements the TTL value to zero and generates an ICMP error message 16.

Next, or in parallel with sending communications 11, 13 and 15, computer A sends communication 17 including IP packet 17A with TTL equal to four and STUN request 17B. Communication 17 reaches router R2 just as communication 15 did. Since router R2 does not decrement the TTL to zero, the communication 17 also reaches computer B.

When the communication 17 is received at the computer B, in contrast to other traceroute methods, no error message is generated. Instead, the STUN request 11B is received at STUN server 21, which generates a STUN response 18 addressed to computer A. The STUN server 21 includes an address and UDP port observed by the STUN server 21 in the STUN request 17B, which includes either an address for computer A or an address of an intermediary on-path network address translating device (which in turn will forward the message to computer A after performing the necessary network address and port translation).

The STUN response 18 is able to pass through on-path security devices in a similar fashion as communications 15 and 17. Accordingly, computer A receives the STUN response 18 and observes that the traceroute is complete. For example, since the communication 17 having TTL equal to four elicited the STUN response 18, both routers R1 and R2 and the NAT 22 on the media path have been identified because of the earlier STUN traceroute messages with TTL values equal to one, two, and three.

The information gained from the completed traceroute is a valuable diagnostic tool for computer A. In one example, computer A can pinpoint a portion of a path that causes an overall communication delay by comparing timing information associated with the received responses. For example, when computer A receives a first response from a first router in ten milliseconds and a second response from a second router in two hundred milliseconds, computer A can pinpoint an overall delay to the portion of the network that couples the first and second routers. Computer A can make numerous other conclusions using information from the completed traceroute, e.g. determining where connectivity problems occur, as would be recognized by one of ordinary skill in the art.

Figure 2:
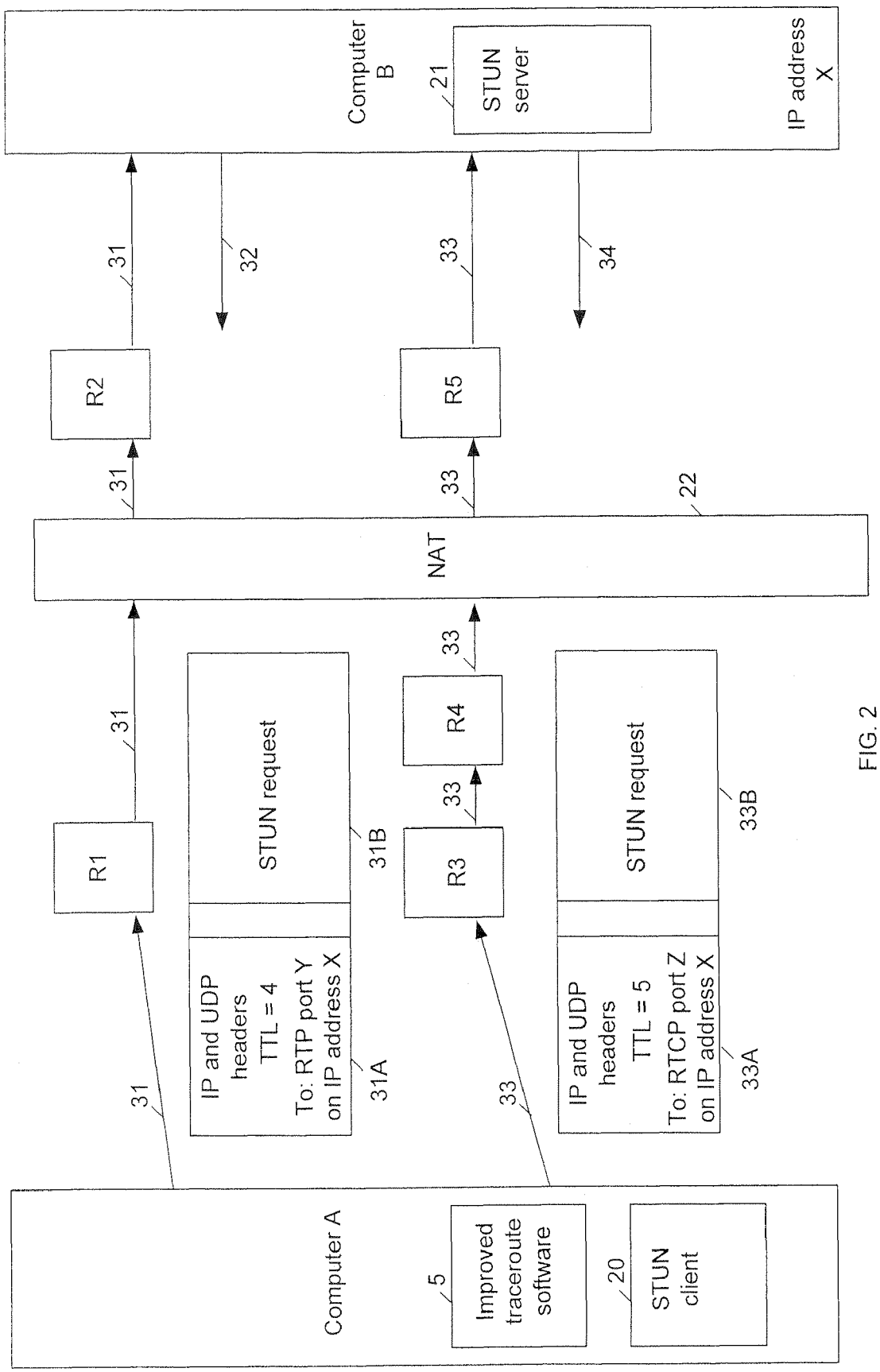
FIG. 2 illustrates an example of the computer illustrated in FIG. 1 for conducting both an Real-Time Protocol (RTP) path traceroute and an Real-Time Control Protocol (RTCP) path traceroute.

FIG. 2 illustrates an example of the computer illustrated in FIG. 1 for conducting both an RTP path traceroute and an RTCP path traceroute.

Computer A may conduct different traceroutes to determine whether an RTP path uses the same or a different path through the network than an RTCP path. The RTP protocol is used to transfer audio and video data between to endpoints, while the RTCP protocol is used to send out of band control information associated with an RTP flow. Since the RTP flow and the RTCP flows carry different types of information, they are addressed to different ports, and typically have different Differentiated Services CodePoint (DSCP) values, these flows can have different priorities and may take different paths through the network. When the RTP path and the RTCP path flow through different routers, computer A can traceroute each of the different flow paths to diagnose issues with either of the paths. Tracerouting the separate paths is not possible using conventional traceroute techniques.

To traceroute the RTP path, computer A sends several communications to computer B using IP address X and RTP port Y. For brevity, only the communication 31 that has a TTL sufficient to reach the computer B is illustrated. It is understood from the previous example, that computer A sends other communications with lower TTL values in parallel with communication 31 or before sending communication 31.

Communication 31 includes IP and UDP headers 31A having a TTL equal to four and containing a STUN request 31B. The IP and UDP headers 31A indicate RTP port Y on IP address X as a destination address. Due to the use of a valid port, intervening security devices allow the communication 31 to pass. Also, due to the similar addressing the communication 31 follows the path of the RTP flow, which in this example passes through routers R1 and R2. The communication 31 may also include a priority indicator such as a Differential Services Code Point (DSCP) value equal to a DSCP value for the RTP flow, which indicates that communication 31 is the same priority as the RTP flow. The use of the DSCP value in communication 31 equal to the DSCP value of the media flow furthermore helps ensure the path taken by the STUN traceroute packet is the same as that of the RTP flow. Computer B receives the communication 31 and responds with a STUN response 32 in a similar manner as explained with reference to FIG. 1.

Still referring to FIG. 2, in this example the RTCP flow takes a different path and flows through routers R3, R4 and R5. To traceroute the RTCP flow, computer A sends communication 33 including IP and UDP headers 33A and a STUN request 33B. It is understood from the previous example, that computer A sends other communications (not shown) with lower TTL values in parallel with communication 33 or before sending communication 33. The IP and UDP headers 33A include a TTL value equal to five, which allows the communication 33 to be forwarded by each of the intermediary routers R3, R4 and R5 located on the RTCP path. The IP and UDP headers 33A include a destination address of RTCP port Z on IP address X, which is the same addressing used for an RTCP flow between the computers A and B. The communication 33 may also include a DSCP value of the RTCP flow, which may be different than the DSCP value included in communication 31. Computer B receives the communication 33 and responds with a STUN response 34 in a similar manner as explained with reference to FIG. 1.

Figure 3:
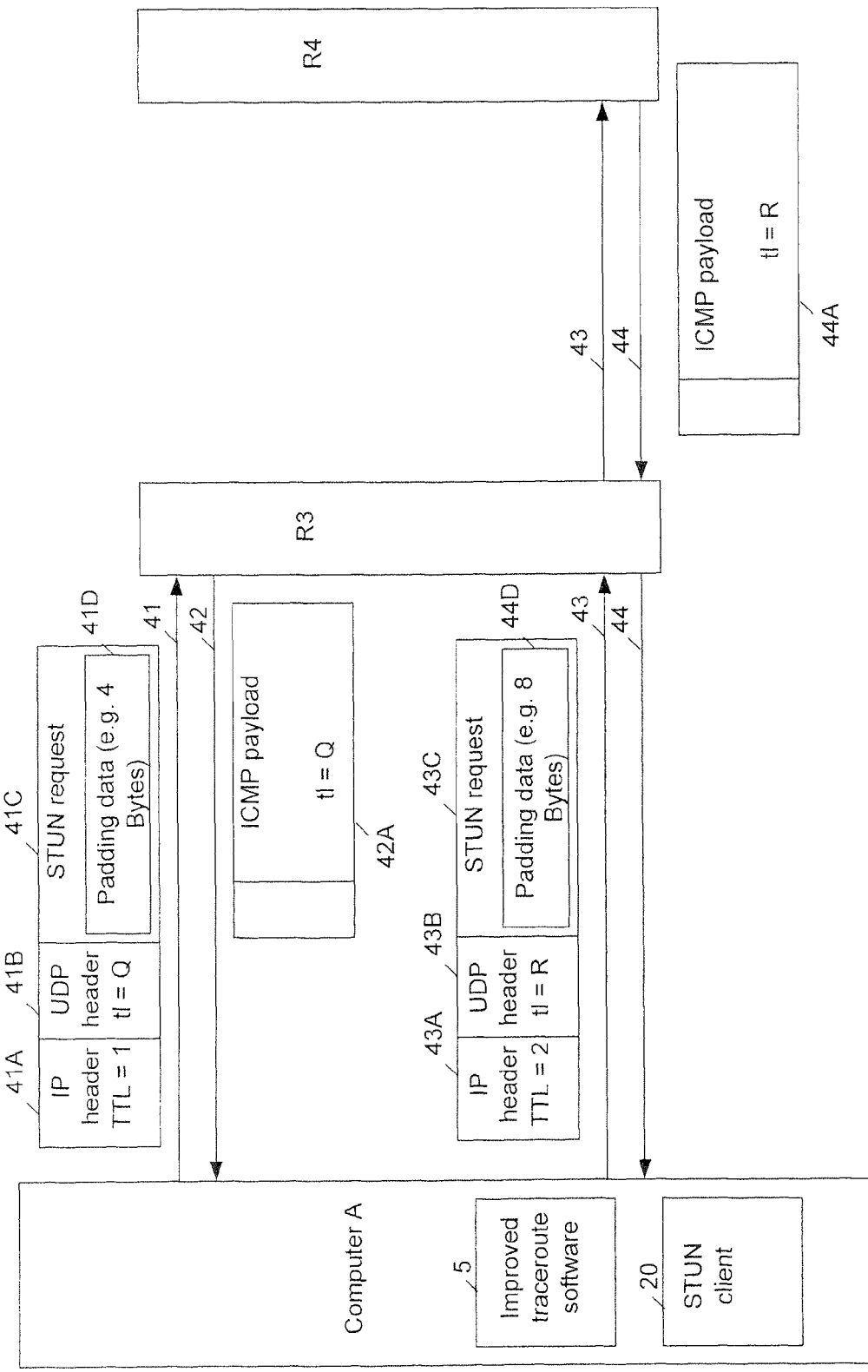
FIG. 3 illustrates an example of the computer illustrated in FIG. 1 for associating traceroute messages with traceroute responses by observing total length fields.

FIG. 3 illustrates an example of the computer illustrated in FIG. 1 for associating traceroute messages with traceroute responses by observing total length fields.

In the previous examples, computer A optionally sent the different traceroute communications having different TTLs in parallel, which means that a second message is sent before a response to the first message has been received. Sending more than one traceroute communication in parallel is advantageous, because doing so reduces the total time required to complete the traceroute as compared to a sequential process. The software 5 includes a technique for correlating a received ICMP error or STUN response with a sent traceroute communication independently of an order of arrival of the responses. As will be explained, this technique leverages the fact that routers are configured to send ICMP errors that include the IP header and first eight bytes of the IP payload from the original packet. In the case of a STUN request, the IP payload is a UDP packet (containing the STUN request), and the first eight bytes will be the UDP header, which includes the source and destination port number.

The computer A generates a traceroute communication 41 that includes an IP header 41A having a TTL of one, a UDP header 41B and a STUN request 41C. The computer A includes padding data 41D inside the STUN request 41C. In the present example, the padding data 41D includes one or more STUN attributes each being four bytes in size. The padding data 41D affects a total UDP length field included in the UDP header 41B, such that the UDP header 41B indicates a total UDP packet length of Q (the IP header includes a total IP packet length field as well which can be used as an alternative, e.g. if the RTP/RTCP flow is sent over IPsec). In other examples, the padding data 41D may be added to any other practical portion of the communication 41 to manipulate total length.

Router R3 receives the communication 41 and decrements the TTL by one. Upon observing a TTL value equal to zero, the router R3 generates an ICMP error 42. Inside the ICMP payload 42A, the router R3 includes the IP header 41A and the first eight bytes of the IP payload (UDP header 41B or a portion thereof) of the communication 41, which indicates the total length of received packet 41 as well as the source and destination address and port. Next, the router R3 sends the ICMP error 42 back to computer A.

Computer A receives the ICMP error 42 and observes the payload 42A having the portion of the UDP header 41B showing a total length value of Q (alternatively, computer A could examine the length value of the IP header included in the payload in the ICMP response). The computer A then correlates the communication 41 having the UDP header 41B having the source and destination address (from 41A) and port (from 41B) and having a total length field of Q with the response 42 having a payload also showing a total length value of Q. Accordingly, the computer A observes that communications 41 and 42 are associated due to the matching total length field values.

In parallel with sending communication 41, computer A also sends communication 43. The communication 43 includes an IP header 43A having a TTL equal to two, a UDP header 43B and a STUN request 43C. The STUN request 43C may be the same as STUN request 41C, except that a different amount of padding data 43D is included. The padding data 43D may be two STUN attributes, which is equal to eight bytes. The different amount of padding data 43D causes the UDP header 43B to indicate a different total length R for the communication 43.

After router R3 forwards the communication 43, the router R4 receives the communication 43 and decrements the TTL by one. Upon observing a TTL value equal to zero, the router R4 generates an ICMP error 44. Inside the ICMP payload 44A, the router R4 includes the IP header 43A and first eight bytes of the IP payload (at least a portion of UDP header 43B) of the communication 43, which indicates the total length of received packet 43. Next, the router R4 sends the ICMP error 44 back to computer A.

Computer A receives the ICMP error 44 and observes the payload 44A having a portion of the UDP header 43B showing a total length value of R (computer A may examine the source and destination address and port in the ICMP payload as well). The computer A then correlates the communication 43 having the UDP header 43B with the total length field of R with the response 44 also having the payload 44A containing a total length value of R. Accordingly, regardless of the order that responses 42 and 44 arrive, computer A is able to correlate traceroute communications and responses.

Using the total length field to associate traceroute communications with responses can also be used to distinguish responses for an RTP path traceroute from responses for an RTCP path traceroute independently of the arrival order of responses when the RTP and RTCP streams are multiplexed on a single port. Otherwise, differing port numbers may be used to distinguish responses for an RTP path from responses for an RTCP path.

Figure 4:
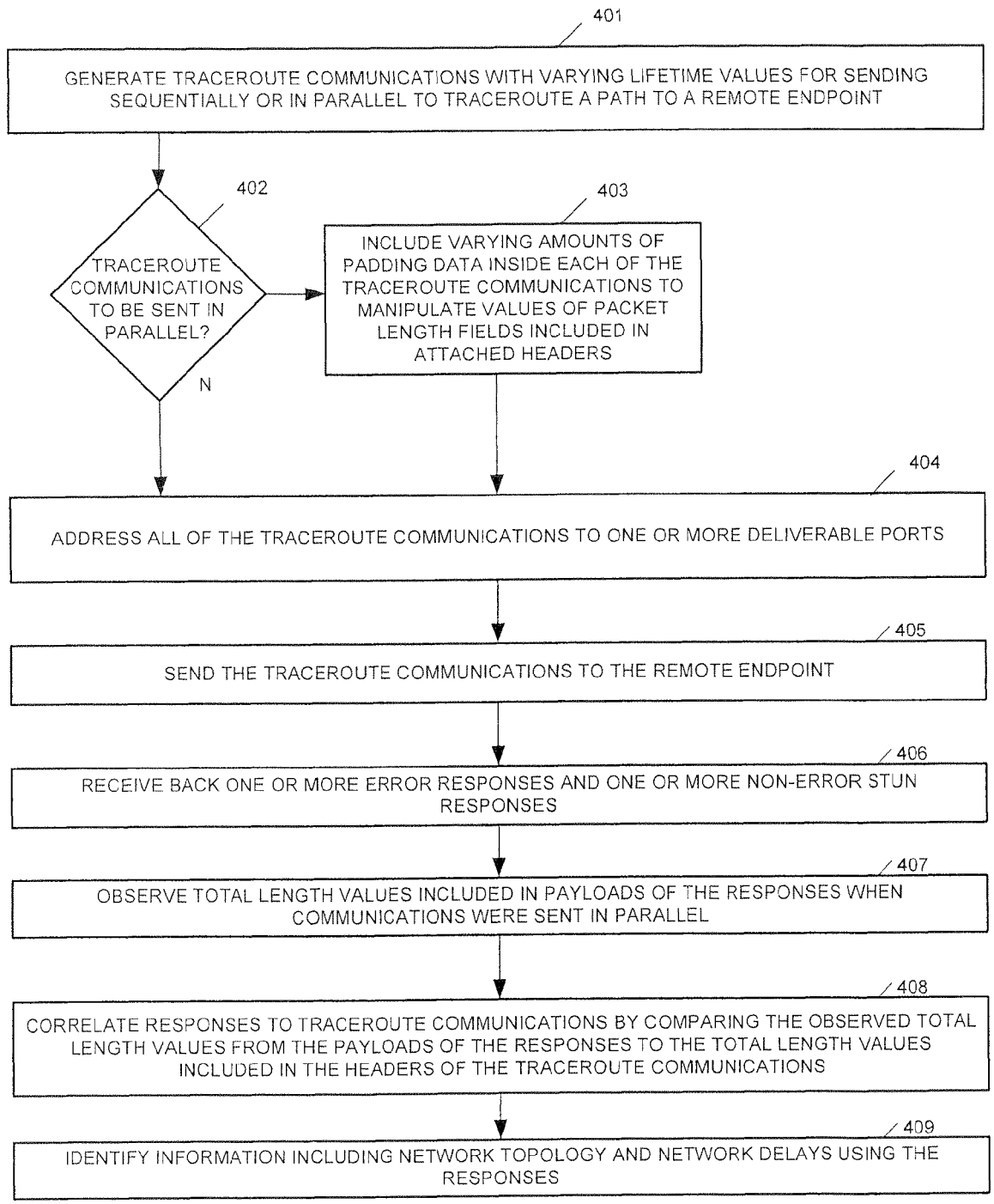
FIG. 4 illustrates an example method for using the computer illustrated in FIGS. 1-3.

FIG. 4 illustrates an example method for using the computer illustrated in FIGS. 1-3.

In block 401, the computer A generates traceroute communications with varying lifetime values for sending sequentially or in parallel to traceroute a path to a remote endpoint. The computer A determines whether the traceroute communications are to be sent in parallel in block 402. Such a determination may be made by accessing local configuration settings. When the communications are to be sent in parallel, in block 403 the computer A includes different amounts of padding data inside each of the traceroute communications to manipulate values of packet length fields in attached headers.

In block 404, the computer A addresses the traceroute communications to one or more valid, deliverable ports on the remote endpoint. In block 405, the computer A sends the addressed traceroute communications to the remote endpoint.

The computer A receives back one or more error responses and one or more non-error STUN responses in block 406. When the communications were not sent sequentially, in block 407 the computer A observes total length values included in payloads of the responses. Although correlation by, for example using total length, is optional when using a serial transfer of the traceroute, correlation is still preferred even in the serial transfer case. In block 408, the computer then correlates responses to traceroute communications by comparing the observed total length values from the payloads to the total length values included in the headers of the traceroute communications. In block 409, the computer A identifies information including network topology and network delays using the responses.

The above examples describe a computer generating traceroutes. In other examples, other endpoints such as a personal computer, an IP phone, a Personal Digital Assistant (PDA), a cell phone, a smart phone, a Publicly Switched Telephone Network (PSTN) gateway, etc., may generate traceroutes using the methods described above.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
a processor; and
a memory coupled to the processor comprising instructions executable by the processor, the processor operable when executing the instructions to:
generate a plurality of messages each having a header and a payload, wherein each header includes a different lifetime value;
generate a Simple Traversal of User Datagram Protocol (UDP) Through Network Address Translators (NATs) (STUN) request;
manipulate the STUN request to generate a plurality of different instances of the STUN request and insert each STUN request instance into a different one of the messages;
send the plurality of messages to a remote endpoint, each of the messages addressed to a valid port on a destination address of the messages;
receive back a plurality of error responses identifying the presence of routers located between an originating endpoint of the messages and the remote endpoint;
receive back a STUN response from a STUN server operating on the destination indicating completion of a traceroute to the remote endpoint; and
correlate each of the error responses as well as the STUN response with a respective one of the messages.

2. The apparatus of claim 1, wherein the STUN response includes an address of an intermediary network address translation device that is located remotely with respect to both endpoints.

3. The apparatus of claim 1, wherein the processor is further operable to:
send audio or video data to a Real Time Protocol (RTP) port on the remote endpoint;
wherein the plurality of messages are addressed to the same RTP port on the remote endpoint.

4. The apparatus of claim 1, wherein each of the STUN request instances has a particular amount of bits that is different than the amount of bits of each of the other STUN request instances.

5. The apparatus of claim 1, wherein each of the error responses includes a portion of the payload of a respective one of the messages, and wherein the processor is further operable to:
examine the message payload portion of one of the error responses to identify a packet length field included therein; and
compare a packet length specified by the packet length field to packet lengths of the messages to match the examined error response to a particular one of the messages.

6. The apparatus of claim 1, wherein the processor is further operable to:
establish a session with the remote endpoint, the session associated with a first network path for transferring media to the remote endpoint and a second network path that is separate from the first network path, the second network path for transferring out of band control information associated with the media to the remote endpoint;
send the plurality of messages over one of the network paths, wherein each of the plurality of messages is marked with a first Differential Services Code Point (DSCP) value;
generate an additional plurality of messages each marked with a second different DSCP value; and
send the additional plurality of messages over the other network path.

7. The apparatus of claim 6, wherein the plurality of messages are addressed to a different valid port on the remote endpoint than the additional plurality of messages.

8. A method, comprising:
generating a plurality of messages each having a header and a payload, wherein each header includes a different lifetime value;
generating a Simple Traversal of User Datagram Protocol (UDP) Through Network Address Translators (NATs) (STUN) request;
manipulating the STUN request to generate a plurality of different instances of the STUN request and inserting each STUN request instance into a different one of the payloads;
sending the plurality of messages to a remote endpoint, each of the messages addressed to a valid port on a destination address of the messages;
receiving back a plurality of error responses identifying the presence of routers located between an originating endpoint of the messages and the remote endpoint;
receiving back a STUN response from a STUN server operating on the destination indicating completion of a traceroute to the remote endpoint; and
correlating each of the error responses as well as the STUN response with a respective one of the messages.

9. The method of claim 8, further comprising:
establishing a session with the remote endpoint, the session associated with a first network path for transferring media to the remote endpoint and a second network path that is separate from the first network path, the second network path for transferring out of band control information associated with the media to the remote endpoint;
sending the plurality of messages over one of the network paths, wherein each of the plurality of messages is marked with a first priority value;

generating an additional plurality of messages each marked with a second different priority value; and sending the additional plurality of messages over the other network path.

10. The method of claim 9, wherein the plurality of messages are addressed to a different valid port on the remote endpoint than the additional plurality of messages.

11. The method of claim 8, wherein each of the STUN request instances has a particular amount of bits that is different than the amount of bits of each of the other STUN request instances.

12. The method of claim 11, wherein each of the error responses includes a portion of the payload of a respective one of the messages, and wherein the method further comprises:

examining the message payload portion of one of the error responses to identify a packet length field included therein; and comparing a packet length specified by the packet length field to packet lengths of the messages to match the examined error response to a particular one of the messages.

13. An apparatus, comprising:

means for generating a plurality of messages each having a header and a payload, wherein each header includes a different lifetime value;

means for generating a Simple Traversal of User Datagram Protocol (UDP) Through Network Address Translators (NATs) (STUN) request;

means for manipulating the STUN request to generate a plurality of different instances of the STUN request and inserting each STUN request instance into a different one of the payloads;

a network interface configured to transmit the plurality of messages and receive back a STUN response from a STUN server operating on the destination as well as a plurality of error responses from routers located between an originating endpoint of the messages and a remote endpoint; and means for correlating each of the error responses as well as the STUN response with a respective one of the messages.

14. The apparatus of claim 13, further comprising:

means for establishing a session with the remote endpoint, the session associated with a first network path for transferring media to the remote endpoint and a second network path that is separate from the first network path, the second network path for transferring out of band control information associated with the media to the remote endpoint;

means for generating an additional plurality of messages each addressed to a different valid port on the remote endpoint than the plurality of messages; and the network interface configured to send all the messages, wherein the plurality of messages travels over one of the network paths and the additional plurality of messages travels over the other network path.

15. The apparatus of claim 14, further comprising means for marking each of the plurality of messages with a first Differential Services Code Point (DSCP) value and each of the additional plurality of messages with a second different DSCP value.

16. The apparatus of claim 14, wherein one of the valid ports matches a port number used for transferring the media and the other valid port does not match the port number used for transferring the media.

17. The apparatus of claim 13, wherein each of the STUN request instances has a particular amount of bits that is different than the amount of bits of each of the other STUN request instances.

18. The apparatus of claim 17, wherein each of the error responses includes a portion of the payload of a respective one of the messages, and wherein the apparatus further comprises:

means for examining the message payload portion of one of the error responses to identify a packet length field included therein; and means for comparing a packet length specified by the packet length field to packet lengths of the messages to match the examined error response to a particular one of the messages.

* * * * *